United States Patent
Jiang (10) Patent No.: US 12,144,033 B2
(45) Date of Patent: *Nov. 12, 2024

(54) RANDOM ACCESS METHOD AND DEVICE, USER EQUIPMENT AND COMPUTER-READABLE STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,633

(22) Filed: Mar. 31, 2023

(65) Prior Publication Data

US 2023/0247681 A1 Aug. 3, 2023

Related U.S. Application Data

(63) Continuation of application No. 16/649,152, filed as application No. PCT/CN2017/103220 on Sep. 25, 2017, now Pat. No. 11,641,674.

(51) Int. Cl.
*H04W 74/08* (2024.01)
*H04W 52/36* (2009.01)
(Continued)

(52) U.S. Cl.
CPC ..... *H04W 74/0833* (2013.01); *H04W 52/367* (2013.01)

(58) Field of Classification Search
CPC ........... H04W 74/0833; H04W 52/367; H04W 52/325; H04W 36/0005; H04W 52/42; H04B 7/0617
See application file for complete search history.

(56) References Cited

U.S. PATENT DOCUMENTS 10,849,076 B2 * 11/2020 Lin ................... H04W 16/28
11,178,695 B2 * 11/2021 Jeong ................ H04B 7/0695
(Continued)

FOREIGN PATENT DOCUMENTS

CN 104521312 A 4/2015
CN 104838717 A 8/2015

OTHER PUBLICATIONS

International search report of PCT application No. PCT/CN2017/103220 issued on Jun. 19, 2018.
(Continued)

*Primary Examiner* — Jae Y Lee
*Assistant Examiner* — Aixa A Guadalupe Cruz
(74) *Attorney, Agent, or Firm* — Syncoda LLC; Feng Ma (57) ABSTRACT

A random access method includes: initiating, by user equipment (UE), a random access based on at least one of: initial access, uplink synchronization loss, or reconstruction; selecting, by the UE, a beam to transmit a preamble; determining, by the UE, whether a currently selected beam for transmitting the preamble is identical to multiple recorded beams previously selected for transmitting the preamble; determining, by the UE, that the currently selected beam is identical to one of the multiple recorded beams; determining, by the UE, a value of a pilot power boost counter not to reach a maximum value; and transmitting, by the UE, the preamble at a boosted pilot transmit power.

18 Claims, 4 Drawing Sheets

(51) Int. Cl.
  *H04W 74/02* (2009.01)
  *H04W 74/0833* (2024.01)

(56) References Cited

U.S. PATENT DOCUMENTS

| | | |
|---|---|---|
| 2009/0011786 A1 | 1/2009 | Lee et al. |
| 2014/0016573 A1 | 1/2014 | Nuggehalli et al. |
| 2014/0376466 A1 | 12/2014 | Jeong et al. |
| 2019/0014570 A1 | 1/2019 | Nam et al. |
| 2020/0059971 A1* | 2/2020 | Qian .................. H04B 7/0695 |
| 2020/0112993 A1 | 4/2020 | Tsai et al. |
| 2020/0145079 A1 | 5/2020 | Marinier et al. |
| 2020/0245200 A1* | 7/2020 | Xiong .................. H04B 7/0626 |
| 2021/0153244 A1* | 5/2021 | Ohara .................. H04B 7/0404 |
| 2021/0282194 A1 | 9/2021 | Zhang et al. |

OTHER PUBLICATIONS

China National Intellectual Property Administration, First office action of Chinese application No. 201780001605.4 issued on Apr. 26, 2020, which is foreign counterpart application of this US application.

Nokia et al, NR Random Access Procedure, 3GPP TSG-RAN WG1#88bis, R1-1704943, Apr. 7, 2017 (Apr. 7, 2017), sections 3.2-3.3 and 4.5.

Mediatek Inc, PRACH Msg1 Retransmission, 3GPP TSG RAN WG1 NR Ad-Hoc#2, R1-1710823, Jun. 30, 2017 (Jun. 30, 2017), entire document.

LG Electronics, Discussion on RACH Procedure, 3GPP TSG RAN WG1 Meeting #88bis , R1-1704869, Apr. 7, 2017 (Apr. 7, 2017), entire document.

Non-final office Action of U.S. Appl. No. 16/649,152 issued on Sep. 23, 2021.

Final office Action of U.S. Appl. No. 16/649,152 issued on Mar. 9, 2022.

Advisory Action of U.S. Appl. No. No. 16/649,152 issued on May 13, 2022.

Non-final office Action of U.S. Appl. No. 16/649,152 issued on Jun. 15, 2022.

Notice of allowance of U.S. Appl. No. 16/649,152 issued on Dec. 29, 2022.

* cited by examiner

RANDOM ACCESS METHOD AND DEVICE, USER EQUIPMENT AND COMPUTER-READABLE STORAGE MEDIUM

CROSS-REFERENCE TO RELATED APPLICATIONS

This is a continuation of U.S. patent application Ser. No. 16/649,152 filed on Mar. 20, 2020, which is a national stage of International Application No. PCT/CN2017/103220 filed on Sep. 25, 2017. The disclosures of the above-referenced applications are hereby incorporated by reference in their entirety.

BACKGROUND

In a long term evolution (LTE) system, a base station transmits a broadcast and covers an entire sector by a beam. In new radio (NR), the base station can cover a sector through narrow beam scanning. That is, the base station transmits only one narrow beam in a direction at a specific time, and then covers the sector by constantly changing the direction of the beam. This scenario is referred to as a multi-beam scenario.

In the multi-beam scenario, user equipment (UE) is firstly associated to an optimal downlink beam by measuring a downlink signal. With respect to UE having a Tx-Rx correspondence, the UE may determine the most appropriate uplink beam by receiving a downlink beam. However, with respect to some UEs having no Tx-Rx correspondence, the UEs cannot determine their own uplink beams, and in this case, the UEs need to attempt to transmit data over different beams to determine the most appropriate uplink beam.

With respect to a random access, after a UE transmits a preamble on a beam, if the UE fails to successfully receive feedback about the preamble from the base station, the UE may re-select a beam to transmit the preamble.

At present, in a single-preamble transmission scenario, the Third Generation Partnership Project (3GPP) discusses and determines that in preamble retransmission, if the UE changes the beam, the preamble is transmitted at a previous transmit power, that is, power will not be boosted. The power may be boosted only when the beam is not changed during two consecutive retransmissions, and the preamble is transmitted at a boosted transmit power.

However, in this case, the following problem may be caused. Assuming that the UE has three transmit beams, beam 1, beam 2 and beam 3, then when the UE make a random access attempt, if the UE does not receive feedback about the preamble transmitted on the beam 1 from the base station, the UE may select the beam 2 to transmit the preamble, and if still no feedback is received, the UE may still transmit the preamble on the beam 3. According to the current 3PGG protocols, the preamble is transmitted on the beam 1, the beam 2 and the beam 3 at the same power. In this case, since no feedback is received with respect to the preambles transmitted over all the beams, the UE is desired to retransmit the preamble on the beam 1 at a boosted power. However, under the current protocols, when the UE switches from the beam 3 to the beam 1, the UE still maintains the power unchanged, and thus the UE may not boost the power, such that the base station fails to receive the preamble.

SUMMARY

In view of the above, the present disclosure provides a random access method and a random access device, and a user equipment and a computer-readable storage medium thereof, such that a transmit power can be boosted when a UE switches a beam, and thus a probability that a base station receives a preamble is improved.

According to the first aspect of embodiments of the present disclosure, a random access method is provided. The method includes:

judging whether a currently selected beam for transmitting a preamble is identical to one of at least one recorded beam for transmitting the preamble; and when the currently selected beam is identical to one of the at least one recorded beam, clearing all beams previously recorded, recording the currently selected beam, and transmitting the preamble at a boosted pilot transmit power when it is determined that a value of a pilot power boost counter does not reach a maximum value.

In an embodiment, the method further includes:
transmitting the preamble at a previous pilot transmit power when it is determined that the value of the pilot power boost counter reaches the maximum value.

In an embodiment, the method further includes:
accumulating the value of the pilot power boost counter by 1 when it is determined that the value of the pilot power boost counter does not reach the maximum value.

In an embodiment, the method further includes:
when the currently selected beam is not identical to any of all the recorded beams, recording the currently selected beam and transmitting the preamble at a previous pilot transmit power.

In an embodiment, transmitting the preamble at the boosted pilot transmit power includes:
boosting the pilot transmit power by one step value, and transmitting the preamble at the boosted pilot transmit power.

In an embodiment, recording the currently selected beam includes:
recording the currently selected beam on a medium access control (MAC) layer or a physical layer.

In an embodiment, the method further includes:
when the currently selected beam is recorded in the MAC layer, receiving information of the current selected beam from the physical layer in the MAC layer; and
when the currently selected beam is recorded in the physical layer, at each time of transmitting the preamble, transmitting indication information to the MAC layer from the physical layer, the indication information being intended to indicate whether the current transmitting of the preamble requires boosting the pilot transmit power or requires accumulating the value of the pilot power boost counter by 1.

According to the second aspect of embodiments of the present disclosure, a random access device is provided. The random access device includes:

a judging module, configured to judge whether a currently selected beam for transmitting a preamble is identical to one of at least one of recorded beams for transmitting the preamble; and a processing and transmitting module, configured to, when the currently selected beam is identical to one of the at least one recorded beam, clear all the beams previously recorded, record the currently selected beam, and transmit the preamble at a boosted pilot transmit power when it is determined that a value of a pilot power boost counter does not reach a maximum value.

In an embodiment, the processing and transmitting module is further configured to:
transmit the preamble at a previous pilot transmit power when it is determined that the value of the pilot power boost counter reaches the maximum value.

In an embodiment, the processing and transmitting module is further configured to:
accumulate the value of the pilot power boost counter by 1 when it is determined that the value of the pilot power boost counter does not reach the maximum value.

In an embodiment, the random access device further includes:
a recording and transmitting module, configured to, when the judging module judges that the currently selected beam is not identical to any of all the recorded beams, record the currently selected beam and transmit the preamble at a previous pilot transmit power.

In an embodiment, the processing and transmitting module is further configured to:
boost the pilot transmit power by one step value, and transmit the preamble at the boosted pilot transmit power.

In an embodiment, the processing and transmitting module or the recording and transmitting module is further configured to:
record the currently selected beam in a medium access control (MAC) layer or a physical layer.

In an embodiment, the random access device further includes:
a receiving module, configured to, when the processing and transmitting module or the recording and transmitting module records the currently selected beam in the MAC layer, receive information of the current selected beam from the physical layer over the MAC layer; and
an indication transmitting module, configured to, when the processing and transmitting module or the recording and transmitting module records the currently selected beam in the physical layer, at each time of transmitting the preamble, transmit indication information to the MAC layer from the physical layer, the indication information being intended to indicate whether the current transmitting of the preamble requires boosting of the pilot transmit power or requires accumulating the value of the pilot power boost counter by 1.

According to the third aspect of embodiments of the present disclosure, user equipment is provided. The user equipment includes:
a processor; and
a memory for storing instructions executable by the processor;
wherein the processor is configured to:
judge whether a currently selected beam for transmitting a preamble is identical to one of at least one recorded beam for transmitting the preamble; and
when the currently selected beam is identical to one of the at least one recorded beam, clear all the recorded beams, record the currently selected beam, and transmit the preamble at a boosted pilot transmit power when it is determined that a value of a pilot power boost counter does not reach a maximum value.

According to the fourth aspect of embodiments of the present disclosure, a computer-readable storage medium is provided. The medium stores a computer program; wherein the computer program, when being executed by a processor, causes the processor to perform steps of the random access method.

The technical solutions according to the embodiments of the present disclosure can achieve the following beneficial effects:

When the currently selected beam is identical to one of the recorded beams, all the previously recorded beams are cleared, the currently selected beam is recorded, and the preamble is transmitted at the boosted pilot transmit power when it is determined that the value of the pilot power boost counter does not reach the maximum value. In this way, the transmit power can be boosted when the UE switches the beam, such that the probability that the base station receives the preamble can be improved.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Exemplary embodiments are described in detail herein, and examples thereof are illustrated in the accompanying drawings. Where the description hereinafter relates to the accompanying drawings, unless otherwise specified, identical reference numerals in the accompanying drawings denote identical or like elements. Implementation manners described in the following exemplary embodiments do not necessarily represent all the implementation manners consistent with the present disclosure. On the contrary, these implementation manners are merely examples illustrating devices and methods according to some aspects of the present disclosure, as set forth in the appended claims.

Figure 1:
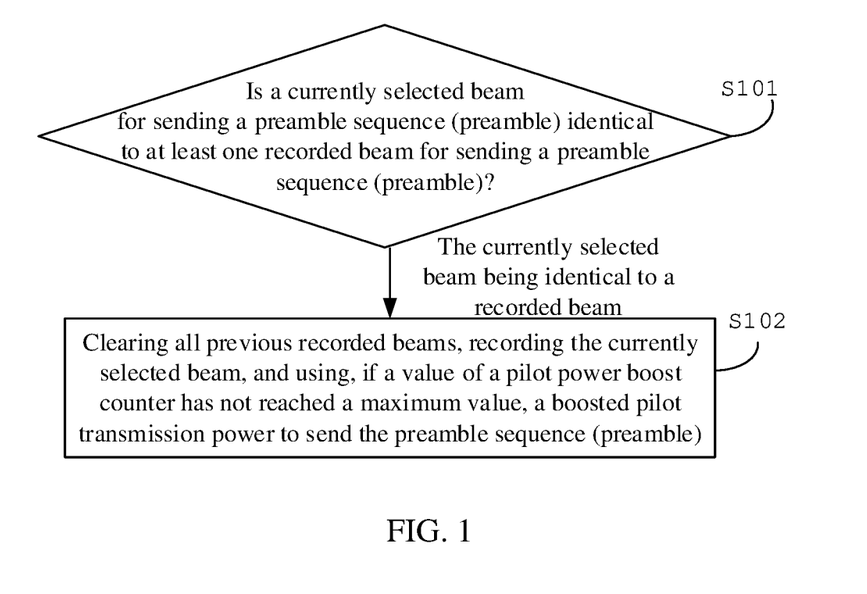
FIG. 1 is a flowchart of a random access method according to an exemplary embodiment of the present disclosure.

FIG. 1 is a flowchart of a random access method according to an exemplary embodiment of the present disclosure. This embodiment is described at a UE side. As illustrated in FIG. 1, the method includes the following steps:

In step S101, whether a currently selected beam for transmitting a preamble is identical to one of at least one recorded beam for transmitting a preamble is judged.

In this embodiment, when the UE needs to initiate a random access due to initial access, uplink synchronization loss, reconstruction and the like reasons, a beam may be selected to transmit the preamble, and the beam is recorded.

When the UE needs to re-transmit the preamble due to failure of receiving feedback about the preamble from a base station, or failure of contention resolution, or when the preambles need to be transmitted for multiple times in a scenario where a plurality of preambles are to be transmitted, the UE may select another beam to transmit the preamble, and records the beam.

After the UE selects the beam for transmitting the preamble, the UE may judge whether the currently selected beam for transmitting the preamble is identical to one of at least one previously recorded beam for transmitting the preamble.

In step S102, if the currently selected beam is identical to one of the at least one recorded beam, all the beams previously recorded are cleared, the currently selected beam is recorded, and the preamble is transmitted at a boosted pilot transmit power when it is determined that a value of a pilot power boost counter does not reach a maximum value.

The pilot power boost counter may be configured in a medium access control (MAC) layer of the UE.

In this embodiment, if the beam currently selected by the UE is identical to one of the at least one previously recorded beam, all the previously recorded beams are cleared, and the currently selected beam is recorded. Meanwhile, if the value of the pilot power boost counter does not reach the maximum value, the pilot transmit power is increased by a step value, and the preamble is transmitted at the boosted pilot transmit power.

Assuming that the previously recorded beams are beam 1, beam 2 and beam 3, since the UE does not receive feedback about the preambles transmitted over the three beams from the base station, the UE needs to re-select a beam. Assuming that the currently selected beam is the beam 1, since the currently selected beam is identical to one of the previously recorded beams, the previously recorded beams 1, 2 and 3 are cleared, and the currently selected beam, that is, the beam 1, is recorded. Meanwhile, if the value of the pilot power boost counter does not reach the maximum value, the pilot transmit power may be boosted by a step value, and the preamble will be transmitted at the boosted pilot transmit power, such that the probability that the base station receives the preamble can be improved.

In addition, the UE can record the currently selected beam in the MAC layer or a physical (PHY) layer. If the currently selected beam is recorded in the MAC layer, information of the currently selected beam is received from the PHY layer over the MAC layer. That is, the PHY layer needs to notify the beam that is used for transmitting the preamble each time to the MAC layer. Since the MAC layer needs to maintain the value of the power boost counter and the pilot transmit power, if the currently selected beam is recorded in the PHY layer, at each time of transmitting the preamble, the PHY layer needs to transmit indication information to the MAC layer, wherein the indication information is intended to indicate whether the current transmitting of the preamble requires boosting the pilot transmit power or requires accumulating the value of the pilot power boost counter by 1.

In this embodiment, by recording the currently selected beam in the MAC layer or the PHY layer, implementation is flexible and diversified. If the currently selected beam is recorded in the MAC layer, the information of the currently selected beam is received from the PHY layer over the MAC layer, such that the currently selected beam is recorded in the MAC layer. If the currently selected beam is recorded in the PHY layer, at each time of transmitting the preamble, the indication information indicating whether the current sending of the preamble requires boosting the pilot transmit power or requires accumulating the value of the pilot power boost counter by 1 is transmitted to the MAC layer from the PHY layer, such that the currently selected beam is recorded in the PHY layer.

In this embodiment, if the currently selected beam is identical to one of the recorded beams, all the previously recorded beams are cleared, the currently selected beam is recorded, and the preamble is transmitted at the boosted pilot transmit power when it is determined that the value of the pilot power boost counter does not reach the maximum value. In this way, the transmit power can be boosted when the UE switches the beam, such that the probability that the base station receives the preamble can be improved.

Figure 2:
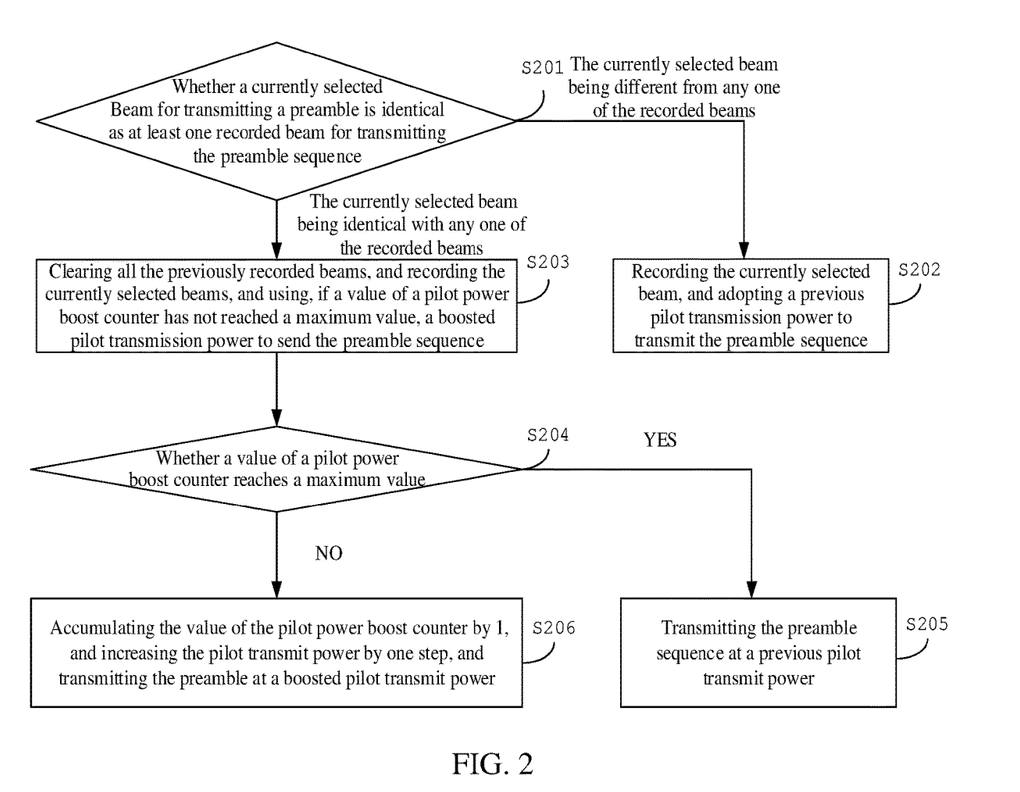
FIG. 2 is a flowchart of a random access method according to another exemplary embodiment of the present disclosure.

FIG. 2 is a flowchart of a random access method according to another exemplary embodiment of the present disclosure. This embodiment is described at a UE side. As illustrated in FIG. 2, the method includes the following steps:

In step S201, whether a currently selected beam for transmitting a preamble is identical to one of at least one recorded beam for transmitting the preamble is judged.

In step S202, if the currently selected beam is not identical to any of all the recorded beams, the currently selected beam is recorded and the preamble is transmitted at a previous pilot transmit power. Then the operation ends.

In step S203, when the currently selected beam is identical to one of the at least one recorded beams, all the previously recorded beams are cleared, and the currently selected beam is recorded.

In step S204, whether a value of a pilot power boost counter reaches a maximum value is judged.

In step S205, when the value of the pilot power boost counter reaches the maximum value, the preamble is transmitted at a previous pilot transmit power, and the operation ends.

In step S206, if the value of the pilot power boost counter does not reach the maximum value, the value of the pilot power boost counter is accumulated by 1, and the pilot transmit power is increased by one step value, and the preamble is transmitted at a boosted pilot transmit power.

In this embodiment, if the UE receives feedback about the preamble from a base station and thus completes the random access, the random access is stopped; and otherwise, the process returns to step S201. In addition, during the random access, the UE can further record the retransmission times of the preamble. If the retransmission times reaches a maximum number of retransmission times, the random access is stopped.

In this embodiment, if the currently selected beam is not identical to any of all the recorded beams, the preamble is transmitted at the previous pilot transmit power, such that the probability that the base station receives the preamble is improved through switching the beam; if the currently selected beam is identical to one of the recorded beams and the value of the pilot power boost counter reaches the maximum value, the preamble is transmitted at the previous pilot transmit power, such that the probability that the base station receives the preamble is improved through switching the beam; and if the currently selected beam is identical to one of the recorded beams and the value of the pilot power boost counter does not the maximum value, the preamble is transmitted at the boosted pilot transmit power, such that the transmit power is boosted when the UE switches the beam, and thus the probability that the base station receives the preamble can be improved.

Figure 3:
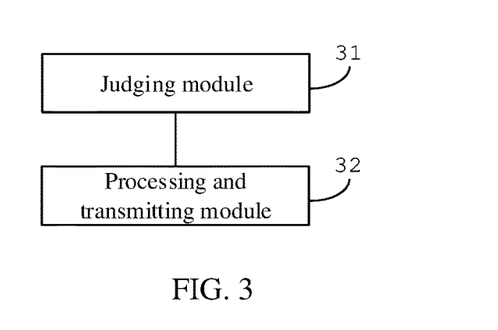
FIG. 3 is a block diagram of a random access device according to an exemplary embodiment of the present disclosure.

FIG. 3 is a block diagram of a random access device according to an exemplary embodiment of the present disclosure. As illustrated in FIG. 3, the random access device includes: a judging module 31 and a processing and transmitting module 32.

The judging module 31 is configured to judge whether a currently selected beam for transmitting a preamble is identical to one of at least one recorded beam for transmitting the preamble.

When the UE needs to re-transmit the preamble due to failure of receiving feedback about the preamble from the base station, or failure of contention resolution, or when the preambles need to be transmitted for multiple times in a scenario where a plurality of preambles are to be transmitted, the UE can select another beam to transmit the preamble, and records the beam.

After the UE selects the beam for transmitting the preamble, the UE can judge whether the currently selected beam for transmitting the preamble is identical to one of at least one previously recorded beam for transmitting the preamble.

The processing and transmitting module 32 is configured to, when the currently selected beam is identical to one of the recorded beams, clear all the beams previously recorded, record the currently selected beam, and transmit the preamble at a boosted pilot transmit power when it is determined that a value of a pilot power boost counter does not reach a maximum value.

The pilot power boost counter may be configured in a MAC layer of the UE.

In this embodiment, if the beam currently selected by the UE is identical to one of the previously recorded beams, all the previously recorded beams are cleared, and the currently selected beam is recorded. Meanwhile, if the value of the pilot power boost counter does not reach the maximum value, the pilot transmit power is boosted by one step value, and the preamble is transmitted at the boosted pilot transmit power.

Assuming that the previously recorded beams are beam 1, beam 2 and beam 3, since the UE does not receive feedback about the preambles transmitted over the three beams from the base station, the UE needs to re-select a beam. Assuming that the currently selected beam is the beam 1, since the currently selected beam is identical to one of the previously recorded beams, the previously recorded beams 1, 2 and 2 are cleared, and the currently selected beam, that is, the beam 1, is recorded. Meanwhile, if the value of the pilot power boost counter does not reach the maximum value, the pilot transmit power may be boosted by one step value, and the preamble may be transmitted at the boosted pilot transmit power, such that the probability that the base station receives the preamble can be improved.

In this embodiment, if the currently selected beam is identical to one of the recorded beams, all the previously recorded beams are cleared, the currently selected beam is recorded, and the preamble is transmitted at the boosted pilot transmit power when it is determined that the value of the pilot power boost counter does not reach the maximum value. In this way, the transmit power may be boosted when the UE switches the beam, such that the probability that the base station receives the preamble can be improved.

In one embodiment, the processing and transmitting module 32 can be further configured to, when it is determined that the value of the pilot power boost counter reaches the maximum value, transmit the preamble at the previous pilot transmit power.

In this embodiment, if the currently selected beam is identical to one of the recorded beams and the value of the pilot power boost counter reaches the maximum value, the preamble is transmitted at the previous pilot transmit power, such that the probability that the base station receives the preamble can improved through switching the beam.

In another embodiment, the processing and transmitting module 32 can be further configured to, when it is determined that the value of the pilot power boost counter does not reach the maximum value, accumulate the value of the pilot power boost counter by 1.

In this embodiment, whether the value of the pilot power boost counter reaches the maximum value may be accurately judged by updating the value of the pilot power boost counter.

Figure 4:
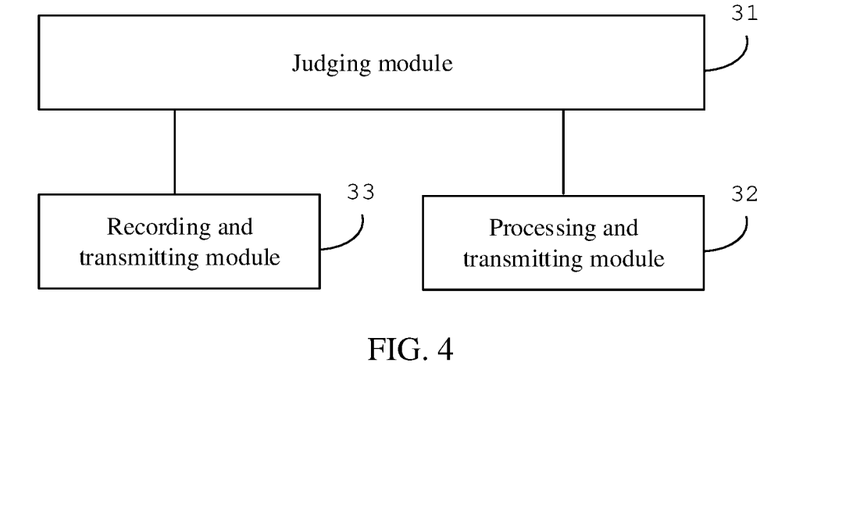
FIG. 4 is a block diagram of according to another exemplary embodiment of the present disclosure.

FIG. 4 is a block diagram of a random access device according to an exemplary embodiment of the present disclosure. As illustrated in FIG. 4, on the basis of the embodiment as illustrated in FIG. 3, the random access device may further include: a recording and transmitting module 33.

The recording and transmitting module 33 is configured to, when the judging module 31 judges that the currently selected beam is not identical to any of all the recorded beams, record the currently selected beam and transmit the preamble at a previous pilot transmit power.

In this embodiment, when the currently selected beam is not identical to any of all the recorded beams, the preamble is transmitted at the previous pilot transmit power, such that the probability that the base station receives the preamble can be improved by switching the beam.

In one embodiment, the processing and transmitting module 32 or the recording and transmitting module 33 can be configured to:
record the currently selected beam in a MAC layer or a PHY layer.

In this embodiment, by recording the currently selected beam in the MAC layer or the PHY layer, implementation is flexible and diversified.

Figure 5:
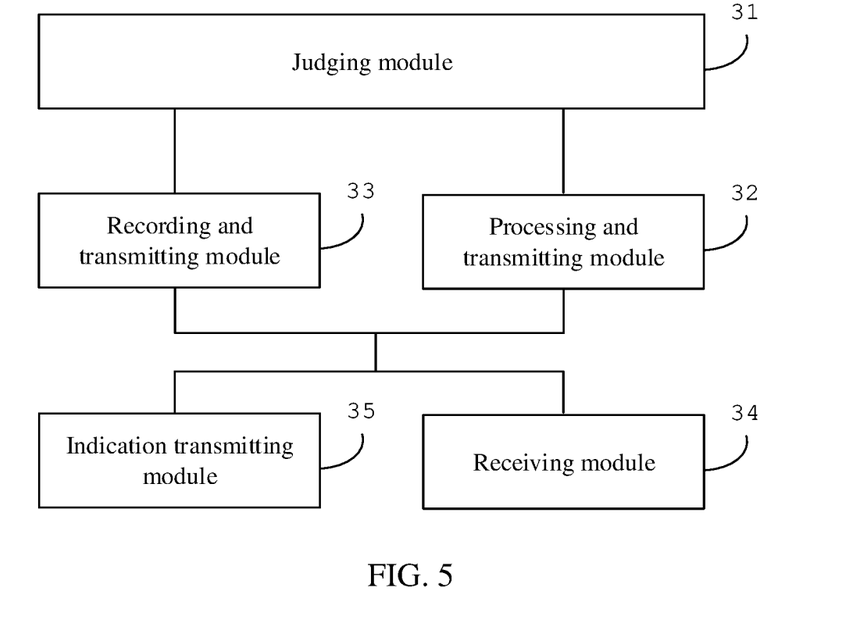
FIG. 5 is a block diagram of a random access device according to still another exemplary embodiment of the present disclosure.

FIG. 5 is a block diagram of a random access device according to still another exemplary embodiment of the present disclosure. As illustrated in FIG. 5, on the basis of the embodiment as illustrated in FIG. 4, the apparatus can further include: a receiving module 34 and an indication transmitting module 35.

The receiving module 34 is configured to, when the processing and transmitting module 32 or the recording and transmitting module 33 records the currently selected beam in the MAC layer, receive information of the current selected beam from the PHY layer over the MAC layer.

The indication transmitting module 35 is configured to, when the processing and transmitting module 32 or the recording and transmitting module 33 records the currently selected beam in the PHY layer, at each time of transmitting the preamble, indication information is transmitted to the MAC layer from the PHY layer, the indication information being intended to indicate whether current transmitting of the preamble requires boosting the pilot transmit power or requires accumulating the value of the pilot power boost counter by 1.

In this embodiment, if the currently selected beam is recorded in the MAC layer, the information of the currently selected beam is received from the PHY layer over the MAC layer, such that the currently selected beam is recorded in the MAC layer. If the currently selected beam is recorded in the PHY layer, at each time of transmitting the preamble, the indication information indicating whether the current transmitting of the preamble requires boosting the pilot transmit power or requires accumulating the value of the pilot power boost counter by 1 is transmitted to the MAC layer from the PHY layer, such that the currently selected beam is recorded in the PHY layer.

Figure 6:
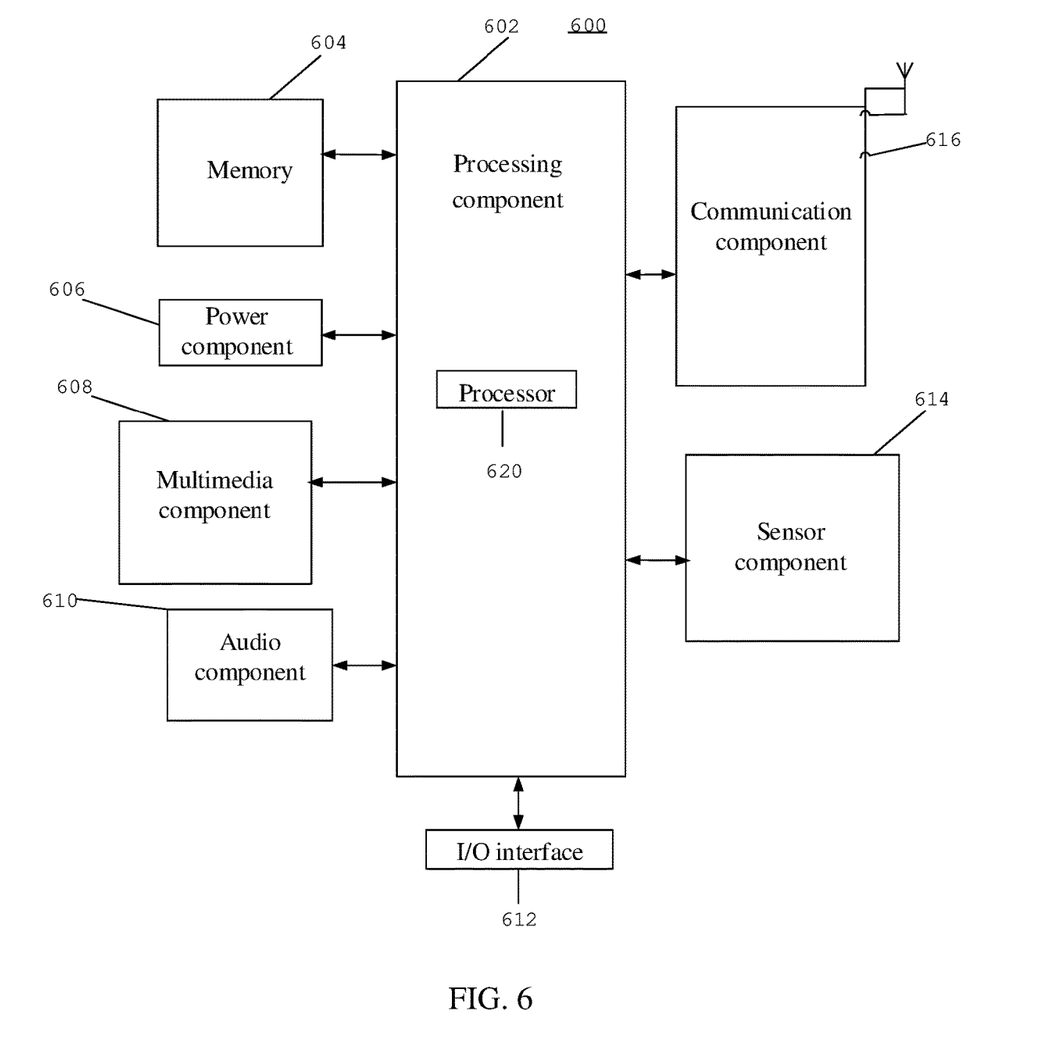
FIG. 6 is a block diagram applicable to a random access apparatus according to an exemplary embodiment of the present disclosure.

FIG. 6 is a block diagram applicable to a random access apparatus 600 according to an exemplary embodiment of the present disclosure. For example, the apparatus 600 may be a UE, such as a mobile phone, a computer, a digital broadcasting terminal, a message transceiver device, a gaming console, a tablet device, medical equipment, fitness equipment, personal digital assistant or the like.

As illustrated in FIG. 6, the apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 generally controls overall operations of the apparatus 600, such as the operations associated with display, telephone calls, data communications, camera operations, and recording operations. The processing component 602 may include at least one processor 620 to execute instructions for performing all or a part of the steps in the above method. In addition, the processing component 602 may include one or more modules which facilitate the interaction between the processing component 602 and other components. For example, the processing component 602 may include a multimedia module to facilitate the interaction between the multimedia component 608 and the processing component 602.

One processor 620 in the processing component 602 may be configured to:
  determine whether a currently selected beam for transmitting a preamble is identical to one of at least one recorded beam for transmitting the preamble; and
  if the currently selected beam is identical to one of the at least one recorded beam, clear all the beams previously recorded, record the currently selected beam, and transmit the preamble at a boosted pilot transmit power when it is determined that a value of a pilot power boost counter does not reach a maximum value.

The memory 604 is configured to store various types of data to support the operations of the apparatus 600. Examples of such data include instructions for any application or method operated on the apparatus 600, contact data, phonebook data, messages, pictures, videos and the like. The memory 604 may be implemented through any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 606 provides power to various components of the apparatus 600. The power component 606 may include a power management system, one or more power supplies, and other components associated with the generation, management, and distribution of power in the apparatus 600.

The multimedia component 608 includes a screen providing an output interface between the apparatus 600 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, or gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive external multimedia data when the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the apparatus 600 is in an operation mode, such as a call mode, a recording mode, or a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and a peripheral interface module, such as a keyboard, a click wheel, a button or the like. The buttons may include, but not limited to, a home button, a volume button, a starting button, and a locking button.

The sensor component 614 includes one or more sensors to provide status assessments of various aspects of the apparatus 600. For example, the sensor component 614 may detect an ON/OFF state of the apparatus 600, relative positioning of components, e.g., the display and the keypad, of the apparatus 600, a change in position of the apparatus 600 or a component of the apparatus 600, a presence or absence of user in contact with the apparatus 600, an orientation or an acceleration/deceleration of the apparatus 600, and a change in temperature of the apparatus 600. The sensor component 614 may include a proximity sensor configured to detect the presence of a nearby object without any physical contact. The sensor component 614 may further include a light sensor, such as a CMOS or CCD image sensor, for use in imaging applications. In some embodiments, the sensor component 614 may further include an accelerometer sensor, a gyroscope sensor, a magnetic sensor, a pressure sensor, or a temperature sensor.

The communication component 616 is configured to facilitate wired or wireless communications between the apparatus 600 and other devices. The apparatus 600 may access a wireless network based on a communication standard, such as Wi-Fi, 2G, 3G, 4G or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

An exemplary embodiment further provides a non-transitory computer-readable storage medium storing instructions, for example, the memory 604 including instructions. The instructions, when being executed by the processor 620 of the apparatus 600, may cause the processor 620 to perform the above methods. For example, the non-transitory computer-readable storage medium may be a read-only memory (ROM), a random-access memory (RAM), a compact disc ROM (CD-ROM), a magnetic tape, a floppy disk, an optical data storage device or the like.

Since the apparatus embodiments substantially correspond to the method embodiments, the apparatus embodiments are described simply, and the relevant part may be obtained with reference to the part of the description in the method embodiments. The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments. Persons of ordinary skill in the art may understand and implement the present disclosure without paying any creative effort.

It should be noted that, in this specification, such relationship-related terms as "first" and "second" are only used to distinguish one entity or operation from another entity or operation, but are not intended to require or imply that there is a practical relationship or sequence between these entities or operations. It should be noted that, in this specification, terms "comprises", "comprising", "has", "having", "includes", "including", "contains", "containing" or any other variation thereof, are intended to cover a non-exclusive inclusion, such that a process, method, article, or device, that comprises, has, includes, contains a list of elements does not include only those elements but may include other elements not expressly listed or inherent to such process, method, article, or device. An element proceeded by "comprises . . . a", "has . . . a", "includes . . . a", "contains . . . a" does not, without more constraints, preclude the existence of additional identical elements in the process, method, article, or apparatus.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A random access method, comprising:
   initiating, by user equipment (UE), a random access based on at least one of: initial access, uplink synchronization loss, or reconstruction;
   selecting, by the UE, a beam from multiple beams successively to transmit a preamble;
   re-selecting, by the UE, a beam from the multiple beams in a case that the UE needs to re-transmit the preamble;
   determining, by the UE, whether a currently selected beam for transmitting the preamble is identical to the multiple beams previously selected for transmitting the preamble;
   transmitting, by the UE, the preamble at a boosted pilot transmit power in response to determining that the currently selected beam is identical to one of the multiple beams and a value of a pilot power boost counter does not reach a maximum value.

2. The random access method according to claim 1, further comprising:
   accumulating the value of the pilot power boost counter by 1 in response to that it is determined that the value of the pilot power boost counter does not reach the maximum value.

3. The random access method according to claim 1, further comprising:
   in response to that the currently selected beam is not identical to any of the multiple beams, recording the currently selected beam and transmitting the preamble at a previous pilot transmit power.

4. The random access method according to claim 1, further comprising:
   boosting the pilot transmit power by one step value, and transmitting the preamble at the boosted pilot transmit power.

5. The random access method according to claim 1, further comprising:
   recording the currently selected beam in a medium access control layer or a physical layer.

6. The random access method according to claim 5, further comprising:
   receiving information of the current selected beam from the physical layer over the MAC layer, wherein the currently selected beam is recorded in the MAC layer; and
   transmitting indication information to the MAC layer by the physical layer, the indication information being intended to indicate whether the current transmitting of the preamble requires boosting the pilot transmit power or requires accumulating the value of the pilot power boost counter by 1, wherein the currently selected beam is recorded in the physical layer, at each time of transmitting the preamble.

7. User equipment, comprising:
   a processor; and
   memory for storing instructions executable by the processor;
   wherein the processor is configured to:
   initiate a random access based on at least one of: initial access, uplink synchronization loss, or reconstruction;
   select a beam from multiple beams successively to transmit a preamble;
   re-select a beam from the multiple beams in a case that the UE needs to re-transmit the preamble;
   determine whether a currently selected beam for transmitting the preamble is identical to the multiple beams previously selected for transmitting the preamble; and
   transmit the preamble at a boosted pilot transmit power in response to determining that the currently selected beam is identical to one of the multiple beams and a value of a pilot power boost counter does not reach a maximum value.

8. A non-transitory computer-readable storage medium, which stores a computer program; wherein the computer program, when being executed by a processor, causes the processor to:
  initiate a random access based on at least one of: initial access, uplink synchronization loss, or reconstruction;
  select a beam from multiple beams successively to transmit a preamble;
  re-select a beam from the multiple beams in a case that the UE needs to re-transmit the preamble;
  determine whether a currently selected beam for transmitting the preamble is identical to the multiple beams previously selected for transmitting the preamble; and
  transmit the preamble at a boosted pilot transmit power in response to determining that the currently selected beam is identical to one of the multiple beams and a value of a pilot power boost counter does not reach a maximum value.

9. The non-transitory computer-readable storage medium according to claim 8, wherein the computer program, when being executed by the processor, further causes the processor to accumulate the value of the pilot power boost counter by 1 in response to that it is determined that the value of the pilot power boost counter does not reach the maximum value.

10. The non-transitory computer-readable storage medium according to claim 8, wherein the computer program, when being executed by the processor, further causes the processor to record the currently selected beam and transmitting the preamble at a previous pilot transmit power in response to that the currently selected beam is not identical to any of the recorded multiple beams.

11. The non-transitory computer-readable storage medium according to claim 8, wherein the computer program, when being executed by the processor, causes the processor to transmit the preamble at the boosted pilot transmit power, the computer program causes the processor to boost the pilot transmit power by one step value, and transmitting the preamble at the boosted pilot transmit power.

12. The non-transitory computer-readable storage medium according to claim 8, wherein the computer program, when being executed by the processor, causes the processor to record the currently selected beam, the computer program causes the processor to record the currently selected beam in a medium access control layer or a physical layer.

13. The user equipment according to claim 7, wherein the processor is further configured to accumulate the value of the pilot power boost counter by 1 in response to that it is determined that the value of the pilot power boost counter does not reach the maximum value.

14. The user equipment according to claim 7, wherein the processor is further configured to record the currently selected beam and transmitting the preamble at a previous pilot transmit power in response to that the currently selected beam is not identical to any of the recorded beams.

15. The user equipment according to claim 7, wherein the processor is further configured to transmit the preamble at the boosted pilot transmit power, the processor is configured to boost the pilot transmit power by one step value, and transmitting the preamble at the boosted pilot transmit power.

16. The user equipment according to claim 7, wherein the processor is further configured to:
  record the currently selected beam, the processor is configured to record the currently selected beam in a medium access control layer or a physical layer;
  receive information of the current selected beam from the physical layer over the MAC layer in response to that the currently selected beam is recorded in the MAC layer; and
  transmit indication information to the MAC layer by the physical layer in response to that the currently selected beam is recorded in the physical layer, at each time of transmitting the preamble, the indication information being intended to indicate whether the current transmitting of the preamble requires boosting the pilot transmit power or requires accumulating the value of the pilot power boost counter by 1.

17. A mobile terminal implementing the method of claim 1, wherein the mobile terminal is configured to boost a transmit power in response to that the mobile terminal switches the beam, to thereby improve a probability for a base station to receive the preamble.

18. The non-transitory computer-readable storage medium according to claim 12, wherein the computer program, when being executed by the processor, further causes the processor to:
  receive information of the current selected beam from the physical layer over the MAC layer in response to that the currently selected beam is recorded in the MAC layer; and
  transmit indication information to the MAC layer by the physical layer in response to that the currently selected beam is recorded in the physical layer, at each time of transmitting the preamble, the indication information being intended to indicate whether the current transmitting of the preamble requires boosting the pilot transmit power or requires accumulating the value of the pilot power boost counter by 1.

* * * * *